(12) United States Patent
Vornwald et al.

(10) Patent No.: US 10,868,437 B2
(45) Date of Patent: Dec. 15, 2020

(54) ELECTRONIC SUBASSEMBLY AND METHOD FOR ACTIVATION THEREOF

(71) Applicant: Robert Bosch GmbH, Stuttgart (DE)

(72) Inventors: Sebastian Vornwald, Wuerzburg (DE); Adrien Mouaffo Tiadjio, Gerlingen (DE); Christoph Maier, Kleinostheim (DE); Jochen Mueller, Backnang (DE); Patric Brand, Sennfeld (DE); Peter Rehbein, Erlabrunn (DE); Roman Ritter, Stuttgart (DE); Thomas Inderwies, Frammersbach (DE); Wolfgang Rueppel, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/168,294

(22) Filed: Oct. 23, 2018

(65) Prior Publication Data
US 2019/0121403 A1    Apr. 25, 2019

(30) Foreign Application Priority Data
Oct. 23, 2017  (DE) .......................... 10 2017 218 841

(51) Int. Cl.
| | |
|---|---|
| *H02J 9/00* | (2006.01) |
| *G06F 1/16* | (2006.01) |
| *G06F 1/18* | (2006.01) |
| *H04B 5/00* | (2006.01) |

(52) U.S. Cl.
CPC ............ *H02J 9/005* (2013.01); *G06F 1/1698* (2013.01); *G06F 1/188* (2013.01); *H04B 5/0037* (2013.01); *H04B 5/0025* (2013.01)

(58) Field of Classification Search
CPC combination set(s) only.
See application file for complete search history.

(56) References Cited

U.S. PATENT DOCUMENTS

| | | | |
|---|---|---|---|
| 8,458,483 B1* | 6/2013 | Bailey ................. | H04B 5/0056 713/182 |
| 9,747,739 B2* | 8/2017 | Gengler ............. | G07C 9/00571 |
| 2017/0237301 A1* | 8/2017 | Elad ........................ | H02J 50/80 307/104 |

* cited by examiner

*Primary Examiner* — Daniel J Cavallari
(74) *Attorney, Agent, or Firm* — Maginot, Moore & Beck LLP

(57) ABSTRACT

A method for activating an electronic subassembly includes receiving at least one activation signal using a reception module of the electronic subassembly. The electronic subassembly is transferred from an idle state to an active state using the at least one activation signal. The electronic subassembly is intermittently supplied with electric power via the at least one activation signal.

7 Claims, 2 Drawing Sheets

ELECTRONIC SUBASSEMBLY AND METHOD FOR ACTIVATION THEREOF

This application claims priority under 35 U.S.C. § 119 to patent application no. DE 10 2017 218 841.3, filed on Oct. 23, 2017 in Germany, the disclosure of which is incorporated herein by reference in its entirety.

BACKGROUND

Many electronic devices have an idle state. To activate the device from the idle state, a switch is regularly provided on the device. However, said switch can be operated by a user only if the user has physical access to the device. Such activation can also be referred to as "waking" or "waking up" the device or a component of the device.

It is also known practice to use wireless interfaces such as, for example, Bluetooth® to access electronic devices. For standby using Bluetooth®, known devices regularly consume a considerable minimum power. Activation from a complete idle state in which no power is consumed is thus not readily possible wirelessly.

In the case of devices without physical operator control elements such as pushbutton switches or switches, it is therefore not possible to use deep-sleep/standby techniques to reduce power consumption, because there are no solutions for executing waking for the electronics by means of interaction. Physical operator control elements require direct access to the device and complicated measures in order also to respect environmental conditions. As such, imperviousness to water and dust is regularly impaired by physical operator control elements. Also, mechanical elements are prone to interference when external forces act, for example as a result of vibration.

SUMMARY

Against this background, it is an object of the present disclosure in this case to solve or at least reduce the technical problems outlined in connection with the prior art. In particular, an electronic subassembly and method for activation thereof are meant to be presented that allow activation of the electronic subassembly from an idle state with particularly low power consumption.

This object is achieved by means of an electronic subassembly and a method for activation thereof according to the features of the patent claims, description, and drawings. The features individually listed in the claims, description, and drawings are combinable with one another in any manner that makes technological sense and can be complemented by explanatory substantive matter from the description, with further variant embodiments of the disclosure being demonstrated.

A method for activating an electronic subassembly is presented that comprises at least receiving at least one activation signal using a reception module of the electronic subassembly. The electronic subassembly is transferred from an idle state to an active state using at least one activation signal, wherein the electronic subassembly is intermittently supplied with electric power by means of the at least one activation signal.

The method described can in particular be used to activate an electronic subassembly from an idle state by means of contactless communication. This in particular requires no physical access to the electronic subassembly.

The electronic subassembly may in particular be intended and configured to record one or more measured variables and transmit them to a data network. As such, in particular a temperature, a magnetic field (which may be characterized by a direction and/or an absolute value), an acceleration (which may be characterized by a direction and/or an absolute value) and/or a light intensity can be measured or can be ascertained from a measured value. Preferably, the electronic subassembly comprises at least one sensor suitable for this purpose. The electronic subassembly can be referred to as a sensor subassembly. Additionally, it is preferred for the electronic subassembly to be designed such that measured values recorded using the sensors can be transmitted contactlessly, for example by radio, Bluetooth®, WLAN, infrared and/or mobile radio. Accordingly, the electronic subassembly can also be referred to as a "sensor connectivity device".

The electronic subassembly is preferably intended and configured to be fitted to a machine tool, a production machine, a vehicle or an industrial installation, for example. In this case, one or more of the electronic subassemblies described can be used to measure measured values at one or more different positions. By way of example, it is thus possible for measured values to be recorded at valves for operating a machine or installation. By way of example, acceleration values can be used to detect damage to a machine part, in particular as a result of a limit value being exceeded. It is also possible for the electronic subassembly to be provided on items and/or shelves in a store. Tremors sensed by means of the acceleration sensor allow damage to the stored items and/or to the shelves to be detected.

The electronic subassembly is preferably of autarkic design, which means that there is in particular no cable connection (either for supplying power to the electronic subassembly or transmitting information) to the electronic subassembly required.

The electronic subassembly preferably has a battery or an autarkic power generator (for example a solar cell or a generator) by means of which the sensors and/or a transmission element for transmitting measured values can be supplied (solely) with power, for example.

It is also preferred for the electronic subassembly to be enclosed such that, by way of example, no water can penetrate the electronic subassembly from the outside. In that case, it is preferred for the electronic subassembly not to have a mechanical user interface such as a switch, for example, via which a user can interact with the electronic subassembly. Instead, the interaction between the user and the electronic subassembly is preferably effected contactlessly. As a result, penetration of water into the electronic subassembly can be prevented permanently, for example.

If the electronic subassembly is of autarkic design, the battery is preferably likewise activated contactlessly. In particular such activation can be achieved using the method described.

At the beginning of the method described, the electronic subassembly is in an idle state. In the idle state, processes envisaged for operating the electronic subassembly, such as measured value recording and/or measured value transmission, for example, are—in contrast to an active state—not performable. The method described can be used to transfer the electronic subassembly from the idle state to the active state.

In particular in this regard, the method described comprises at least receiving at least one activation signal using a reception module of the electronic subassembly.

The at least one activation signal is preferably an electromagnetic signal. The at least one activation signal can be output—in particular at the request of a user—by an activation apparatus, for example.

The at least one activation signal is received by means of the reception module of the electronic subassembly. The at least one activation signal transfers the electronic subassembly from the idle state to the active state using the method described.

The electronic subassembly is intermittently supplied with electric power by means of the at least one activation signal. Thus, the idle state may also be designed such that a power consumption based on a standby state is particularly low or even zero. Contactless communication usually requires the receiver to regularly actively verify whether there is a signal to be received. If a conventional receiver is switched off completely, it is not possible for a signal to be received, not even one for activating the receiver. In the absence of information regarding when an activation signal can be received, a conventional receiver of this kind must therefore be permanently on standby, with power being consumed.

The method described can be used to supply the electronic subassembly with power by means of the activation signal. Preferably, this is effected (only) to an extent that produces an active standby state for the electronic subassembly. The power required for activating the electronic subassembly is thus not taken, in the case of the method described, from a battery of the electronic subassembly, for example, but rather is routed to the electronic subassembly by means of the at least one activation signal.

The at least one activation signal is used to transmit power to the electronic subassembly. In the context of the definition used here for the expressions, the transmission of power by a signal (such as the activation signal) comprises both the transmission of at least one piece of information and the (brief) supply of power. Even in the case of conventional information transmitted by means of electromagnetic signals, there is an input of power. Such an input of power alone is not intended to be understood in this case to mean a supply of power. A supply of power exists (only) when the input of power by means of the signal goes significantly beyond the absolute value that is required for transmitting the information. As such, a supply of power exists in particular when no further power source, such as a battery, for example, is provided or is disconnected from the at least one electronic component at a particular time. If, by way of example, a battery is provided for the purpose of fundamentally supplying power to an electronic component, and if a switch between the battery and the electronic component is closed by means of the activation signal, then the power needed for closing the switch has been transmitted by the signal. In such a case, the electronic subassembly has been supplied with power by means of the signal at least or only until the battery has been incorporated into the circuit by means of the closed switch.

In a preferred embodiment of the method, the electronic subassembly consumes no power in the idle state.

In this embodiment the electronic subassembly can also be referred to as completely deactivated in the idle state. Preferably, no processes are carried out on the electronic subassembly in the idle state. If the electronic subassembly consumes no kind of power in the idle state, in particular no current, then the electronic subassembly, including a battery provided therein, can be stored for a particularly long time before activation is effected. A state of charge for the battery can remain consistently high for a particularly long time in this case, and be reduced only by means of a possible self-discharge of the battery.

Contactless activation from an idle state of this kind is possible using the method described, because the electronic subassembly is in this case intermittently—in particular (only) for the or during the activation—supplied with power.

In a further preferred embodiment of the method, the at least one activation signal is designed according to the type of near field communication.

Near field communication is also known as NFC for short. Near field communication involves electromagnetic signals being exchanged over short distances of, for example, up to 5 cm. The method described is used to transmit not only information by means of such a signal as the at least one activation signal. Rather, the electronic subassembly is intermittently supplied with power in the method described. This is intended to be understood to mean that at least one electronic component that is not used merely for near field communication is supplied with power. Such supply of power to a further electronic component of this kind is not part of known near field communication. Known near field communication involves just one (integral) reception module being supplied with power.

The electronic subassembly preferably has a reception module designed according to the type of near field communication. This can also be referred to as a near field communication module, an NFC module for short. The reception module preferably has at least one electrical coil and a near field microprocessor. The coil can be used to receive a signal that can be converted by means of the near field microprocessor into a signal processable further by further components of the electronic subassembly, in particular by a microprocessor of the electronic subassembly.

In a further preferred embodiment of the method, the at least one activation signal is used to effect an authentication, wherein the electronic subassembly is transferred to the active state only in the event of valid authentication.

The authentication can in particular prevent unauthorized and/or inadvertent activation of the electronic subassembly. Too frequent or erroneous waking can lead to the battery runtime being reduced. To prevent this, there may be provision, by way of example, for the activation to be able to be effected only when an activation signal in a preset coding or configuration is received. Activation can be effected only if such presets are known. Unauthorized parties that do not have such knowledge accordingly cannot perform unauthorized activation.

In a further preferred embodiment of the method, the authentication is effected according to the type of challenge-response method.

The challenge-response method requires a problem to be solved that presupposes particular knowledge. Only someone who is in possession of this knowledge can generate an activation signal with valid authentication and thus activate the electronic subassembly.

In a further preferred embodiment of the method, the electronic subassembly is in the idle state after an initial configuration, wherein the electronic subassembly is transferred to the active state using the at least one activation signal for a first initial use.

Following the manufacture of the electronic subassembly, the electronic subassembly is in the initial configuration. Subsequently, the electronic subassembly can be stored, preferably without power consumption. When the electronic subassembly is meant to be started up for the first time, it can be activated by the method described.

The complete electronics of the electronic subassembly, that is to say, by way of example, an arithmetic and logic unit, a sensor system and communication interfaces, can be deactivated completely following production, for example for storage, in order to save power and significantly extend a life of a battery. Nevertheless, the electronics can be woken up without physical action (e.g. the pressing of a pushbutton switch). The omission of mechanical pushbutton switches can simplify the housing design and extend the life of the electronic subassembly.

Following the programming at the end of the manufacturing process, the electronic subassembly is preferably put into a deep sleep. The central arithmetic and logic unit and the peripherals of the electronic subassembly are therefore deactivated completely and are thus no longer able to react to internal wake sources (such as a realtime clock, for example). Only an input of power externally can initiate wakeup. The omission of mechanical operator control elements simplifies the housing design in terms of imperviousness, resilience and durability, but prevents the input of external power (for example as a result of movement of a pushbutton switch). Instead, an input of power is realized by means of a radio technique such as nearfield communication. This puts the electronic subassembly into the active state (which may be a normal mode, in particular).

Preferably, it is possible for the electronic subassembly to be transferred from the active state to the idle state by means of at least one deactivation signal. In particular, transfer between the active state and the idle state may be possible as often as desired. Alternatively, it is possible for there to be provision for only a one-off transfer of the electronic subassembly from the idle state to the active state.

As a further aspect, an electronic subassembly is presented that comprises at least:
- a reception module,
- a battery, and
- at least one electronic component suppliable with electric power by the battery.

The reception module is configured for drawing and forwarding electric power to the at least one electronic component such that the at least one electronic component is transferable from an idle state, in which the at least one electronic component consumes no power, to a (power-consuming and/or operational) active state.

The particular advantages and configuration features described earlier on for the method are applicable and transferable to the electronic subassembly, and vice versa.

The reception module can in particular receive the at least one activation signal. A resultant input of power can be forwarded from the reception module to the at least one electronic component of the electronic subassembly. This input of power allows the at least one electronic component and hence the electronic subassembly to be transferred from the idle state to the active state. Preferably, the at least one electronic component and hence also the electronic subassembly consume no power in the idle state.

In a preferred embodiment of the electronic subassembly, the reception module is designed according to the type of near field communication.

As a further aspect, an activation apparatus for activating an electronic subassembly using the method described is presented.

The particular advantages and configuration features described earlier on for the method and the electronic subassembly are applicable and transferable to the activation apparatus, and vice versa.

The activation apparatus is a (mobile) smartphone or tablet and/or a (static) operator control unit, for example. It preferably has a piece of software installed on it that can be used to generate the at least one activation signal. Preferably, the activation apparatus has a transmission element that is preferably designed according to the type of near field communication.

If the activation apparatus is embodied in mobile fashion, a user can fit the electronic subassembly to a machine or installation, hold the activation apparatus to the electronic subassembly and activate the electronic subassembly by means of the activation apparatus, for example.

As a further aspect, use of the described electronic subassembly for monitoring the operation of a work machine is presented.

The particular advantages and configuration features described earlier on for the method, the electronic subassembly and the activation apparatus are applicable and transferable to the use, and vice versa.

BRIEF DESCRIPTION OF THE DRAWINGS

The disclosure and the technical setting are explained in more detail below with reference to the figures. The figures show an exemplary embodiment, to which the disclosure is not restricted, however. As clarification, it should be pointed out that the technical features illustrated in the figures can also be combined with features of other figures and/or of the description without requiring other technical features of a figure to be taken on. Insofar as there is a technical need to combine characteristics of one technical feature with those of another, this is explicitly referred to or pointed out, so that otherwise these features are freely combinable.

In the Drawings.

DETAILED DESCRIPTION

Figure 1:
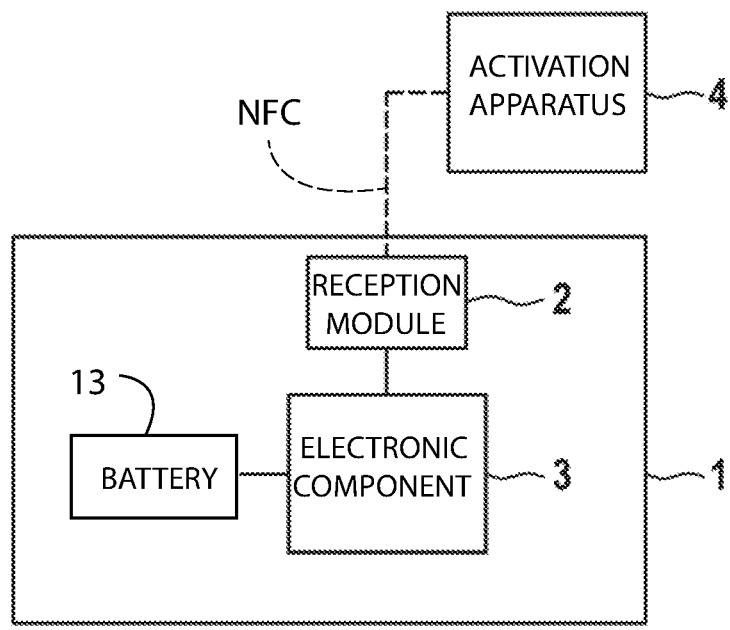
FIG. 1: shows a depiction of an electronic subassembly with an activation apparatus.

FIG. 1 shows an electronic subassembly 1 comprising a reception module 2, a battery 13 and an electronic component 3 suppliable with electric power by the battery 13. The reception module 2, designed according to the type of near field communication, is configured for drawing and forwarding electric power to the electronic component 3 such that the electronic component 3 is transferable from an idle state 5 (shown in FIG. 3), in which the electronic component 3 consumes no power, to an active state 6 (likewise shown in FIG. 3). Additionally, an activation apparatus 4 is shown that—as indicated by a dashed line—can communicate with the electronic subassembly 1 by means of near field communication.

Figure 2:
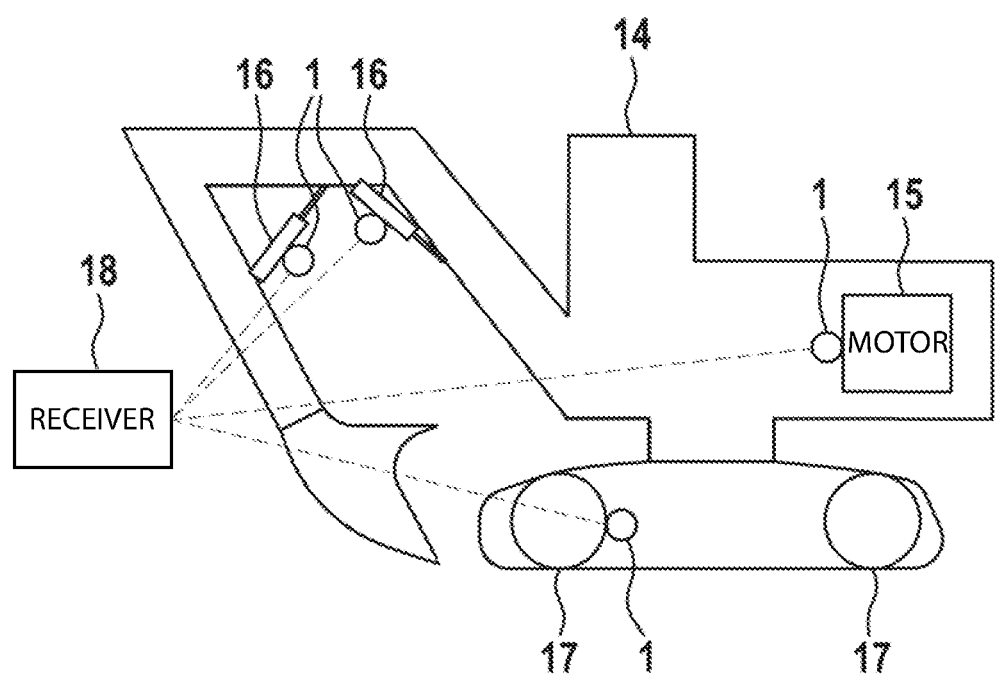
FIG. 2: shows a depiction of a work machine with a plurality of electronic subassemblies according to the embodiment from FIG. 1, and FIG. 3: shows a depiction of a method for activating the electronic subassembly from FIG. 1.

FIG. 2 shows a work machine 14. A motor 15, two hydraulic units 16 and a chain drive 17 are each provided with an electronic subassembly 1 according to the embodiment from FIG. 1. The electronic subassemblies 1 can be used to record measured values and transmit them to a receiver 18. As such, a temperature of the motor 15 and vibrations in the chain drive 17 and in the hydraulic units 16 can be measured, for example.

Figure 3:
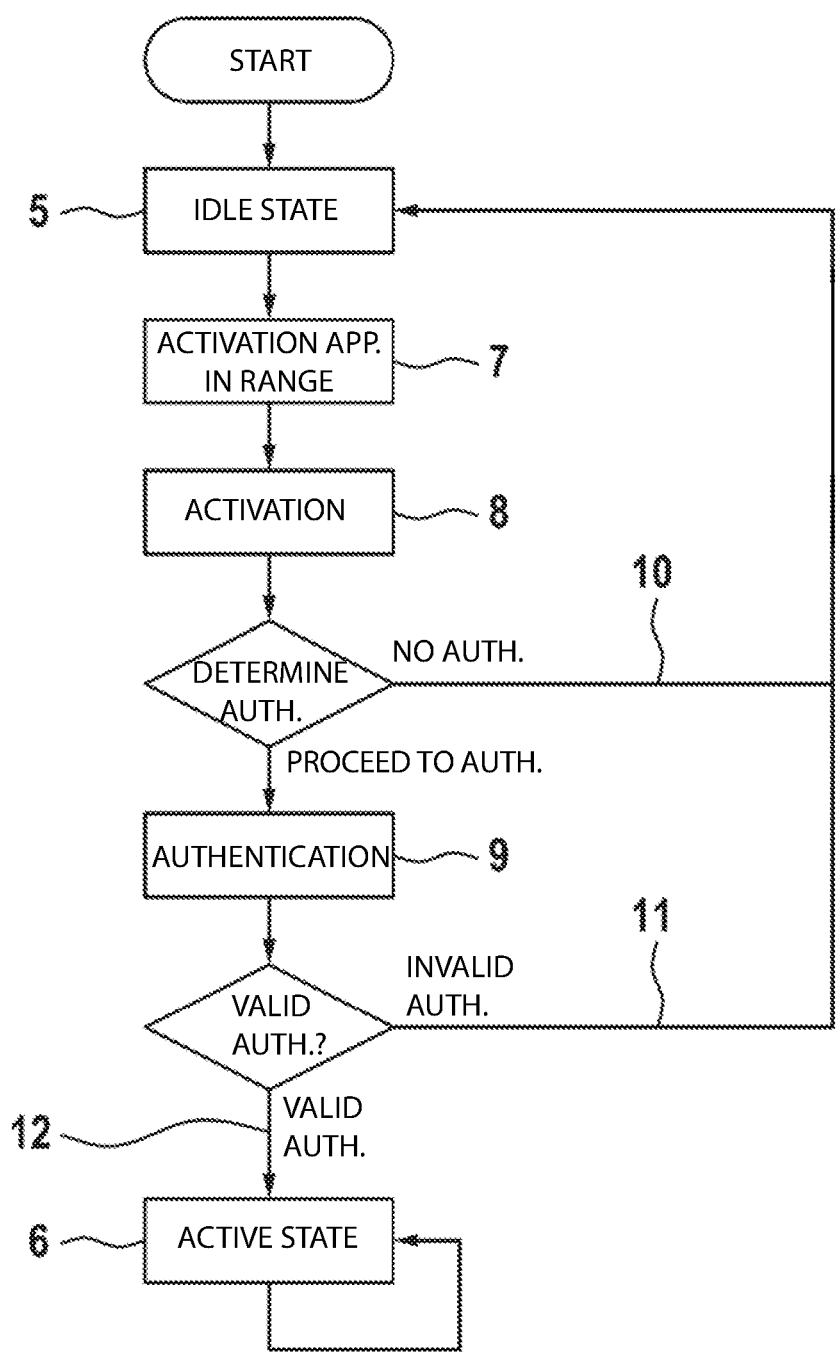

FIG. 3 shows a method for activating the electronic subassembly 1 from FIG. 1. First of all, the electronic subassembly 1 is in the idle state 5. If the activation apparatus 4 is in range, as indicated by the reference sign 7, activation 8 can be effected. This involves the activation signal being transmitted by the activation apparatus 4 and received by the reception apparatus 2. In the present embodiment, authentication, in particular based on the challenge-response method, is required. If no authentication is effected, the electronic subassembly 1 remains in the idle state 5. This is indicated by the reference sign 10. If authentication 9 is effected, it may be invalid. In that case too, the electronic subassembly 1 remains in the idle state 5. This is indicated by the reference sign 11. Valid authentication allows the electronic subassembly 1 to be transferred to the active state 6. This is indicated by the reference sign 12.

Activation results in the electronic subassembly 1 being intermittently supplied with electric power by means of the activation signal.

The electronic subassembly 1 is in the idle state 5 following an initial configuration. The method shown can be used to transfer the electronic subassembly 1 to the active state 6 for a first initial use.

LIST OF REFERENCE SIGNS

1 Electrical subassembly
2 Reception module
3 Electronic component
4 Activation apparatus
5 Idle state
6 Active state
7 Activation apparatus in range
8 Activation
9 Authentication
10 No authentication effected
11 Invalid authentication effected
12 Valid authentication effected
13 Battery
14 Work machine
15 Motor
16 Hydraulic unit
17 Chain drive
18 Receiver

The invention claimed is:

1. A method for activating an electronic subassembly, comprising:
   receiving a near field communication signal comprising electric power and at least one activation signal via a near field communication module of the electronic subassembly;
   transferring the electronic subassembly from an idle state to an active state based on the received at least one activation signal; and
   intermittently supplying the electronic subassembly with the electric power via the received near field communication signal,
   wherein the electronic subassembly is in the idle state after an initial configuration, and
   wherein the electronic subassembly is transferred to the active state using the received at least one activation signal for a first initial use.

2. The method of claim 1, wherein the electronic subassembly consumes no electric power in the idle state.

3. The method of claim 1, further comprising:
   authenticating using the received at least one activation signal,
   wherein the transferring of the electronic subassembly from the idle state to the active state is performed only in the event of a valid authentication.

4. The method of claim 3, wherein the authenticating is a challenge-response method.

5. An electronic subassembly, comprising:
   a battery;
   at least one electronic component configured to be supplied with electric power by the battery in an active state of the at least one electronic component; and
   a near field communication module configured to draw and forward other electric power to the at least one electronic component from a received near field communication signal, such that the at least one electronic component is transferable from an idle state, in which the at least one electronic component consumes no electric power from the battery, to the an active state,
   wherein the near field communication signal comprises the other electric power and at least one activation signal, and
   wherein the at least one electronic component is transferred from the idle state to the active state based on the received at least one activation signal.

6. The method of claim 1, wherein the method is performed by an activation apparatus for activating the electronic subassembly.

7. A method of using the electronic subassembly of claim 5 to monitor an operation of a work machine.

\* \* \* \* \*